United States Patent [19]

Barrera

[11] Patent Number: 5,965,256
[45] Date of Patent: Oct. 12, 1999

[54] PROTECTIVE FILMS AND COATINGS

[75] Inventor: Denise A. Barrera, Oakdale, Minn.

[73] Assignee: Minnesota Mining and Manufacturing Company, St. Paul, Minn.

[21] Appl. No.: 08/949,367

[22] Filed: Oct. 14, 1997

[51] Int. Cl.⁶ .......................... B32B 27/08; B32B 27/16; B32B 27/30; B32B 27/40
[52] U.S. Cl. .......................... 428/354; 428/201; 428/203; 428/204; 428/421; 428/422; 428/423.1; 428/424.2; 428/424.4; 428/522; 427/487; 427/508; 427/521; 427/522; 427/407.1; 526/245; 525/123; 525/126
[58] Field of Search .................................... 428/201, 202, 428/203, 353, 354, 421, 422, 423.1, 424.2, 424.4, 522; 526/245; 525/123, 126; 427/487, 508, 521, 407.1

[56] References Cited

U.S. PATENT DOCUMENTS

| | | | |
|---|---|---|---|
| Re. 24,906 | 12/1960 | Ulrich | 206/59 |
| 3,152,162 | 10/1964 | Fischer et al. | 260/453 |
| 3,227,138 | 1/1966 | Campbell | 119/1 |
| 3,396,164 | 8/1968 | Teotino et al. | 260/244 |
| 3,454,606 | 7/1969 | Brotherton et al. | 260/397.7 |
| 3,455,883 | 7/1969 | Kamal et al. | 260/77.5 |
| 3,492,330 | 1/1970 | Trecker et al. | 260/453 |
| 3,567,763 | 3/1971 | Emmons et al. | 260/478 |
| 3,654,106 | 4/1972 | Wagner et al. | 204/159.23 |
| 3,664,457 | 5/1972 | York | 182/70 |
| 4,128,600 | 12/1978 | Skinner et al. | 266/859 R |
| 4,181,752 | 1/1980 | Martens et al. | 427/54.1 |
| 4,342,793 | 8/1982 | Skinner et al. | 427/44 |
| 4,710,536 | 12/1987 | Klingen et al. | 524/493 |
| 4,742,126 | 5/1988 | Moggi et al. | 525/340 |
| 4,749,590 | 6/1988 | Klingen et al. | 427/54.1 |
| 4,808,471 | 2/1989 | Grunzinger | 428/325 |
| 4,844,955 | 7/1989 | Graefe et al. | 428/420 |
| 4,921,759 | 5/1990 | Orain et al. | 428/424.4 |
| 4,950,696 | 8/1990 | Palazotto et al. | 522/25 |
| 4,985,340 | 1/1991 | Palazzotto et al. | 430/270 |
| 4,986,496 | 1/1991 | Marentic et al. | 244/130 |
| 4,986,516 | 1/1991 | Lonardi | 266/87 |
| 5,009,936 | 4/1991 | Yamanaka et al. | 427/407.1 |
| 5,069,403 | 12/1991 | Marentic et al. | 244/130 |
| 5,133,516 | 7/1992 | Marentic et al. | 244/130 |
| 5,147,900 | 9/1992 | Palazzotto et al. | 522/25 |
| 5,256,170 | 10/1993 | Harmer et al. | 51/293 |
| 5,306,548 | 4/1994 | Zabrocki et al. | 428/215 |
| 5,326,621 | 7/1994 | Palazzotto et al. | 428/195 |
| 5,334,450 | 8/1994 | Zabrocki et al. | 428/332 |
| 5,342,666 | 8/1994 | Ellison et al. | 428/46 |
| 5,360,462 | 11/1994 | Harmer et al. | 51/295 |
| 5,376,428 | 12/1994 | Palazzotto et al. | 428/143 |
| 5,378,520 | 1/1995 | Nagaoka et al. | 428/72 |
| 5,387,304 | 2/1995 | Berner et al. | 156/212 |
| 5,602,221 | 2/1997 | Bennett et al. | 526/307.7 |

FOREIGN PATENT DOCUMENTS

| | | |
|---|---|---|
| 0 359 532 B1 | 3/1990 | European Pat. Off. . |
| 0 519 278 A2 | 12/1992 | European Pat. Off. . |
| 1 072 385 | 7/1960 | Germany . |
| 1 230 778 | 6/1967 | Germany . |
| 2 639 084 | 3/1978 | Germany . |
| 2 714104 | 10/1978 | Germany . |
| 2 721 186 | 11/1978 | Germany . |
| 2 738 154 | 3/1979 | Germany . |
| 2 738 512 | 3/1979 | Germany . |
| 2 714 084 | 10/1980 | Germany . |
| 848671 | 9/1960 | United Kingdom . |
| 874430 | 8/1961 | United Kingdom . |
| WO 92/22619 | 12/1992 | WIPO . |
| WO 94/09983 | 5/1994 | WIPO . |
| WO 96/34028 | 10/1996 | WIPO . |
| WO 96/35458 | 11/1996 | WIPO . |

OTHER PUBLICATIONS

"Encyclopedia of Polymer Science and Technology, Plastics, Resins, Rubbers, Fibers", vol. 8, Keratin to Modacrylic Fibers, John Wiley & Sons, Inc. 1968, p. 279.

Sperling, L. H., Interpenetrating Polymer Networks and Related Materials, Plenum Press, New York, 1981.

*Primary Examiner*—Vivian Chen
*Attorney, Agent, or Firm*—Carolyn V. Peters

[57] ABSTRACT

A multi-layered film disposed on a substrate, the multi-layered film comprising:

(a) an interpenetrating polymer network (IPN) layer; and (b) at least one fluoro-containing polymer layer;

wherein the fluoro-containing polymer layer comprises a perfluoro-acrylate homo-or copolymer, or a perfluoro-vinyl non-acrylate homo-or copolymer. The substrate can be a cured adhesive, preferably a cured pressure-sensitive adhesive (PSA), in which case the fluoro-containing polymer layer is typically situated between the PSA layer and the IPN layer. Alternatively, the substrate can be a surface to be protected from exposure to weather, chemical exposure, graffiti, or the like, such as, for example, a vehicle such as an automobile, a truck, a boat, or an aircraft; an outdoor sign; or a building exterior.

21 Claims, No Drawings

PROTECTIVE FILMS AND COATINGS

FIELD OF THE INVENTION

This invention relates to protective and decorative film-based coatings for surfaces exposed to adverse environments, including outdoor weather, solvents, dirt, grease, marine environments, and the like. Films of the invention comprise interpenetrating polymer networks, preferably acrylate-urethane interpenetrating polymer networks. They may optionally have a layer of a highly fluorinated polymer at the outermost, exposed surface. The invention provides the films, a method of making the films, and a method of using the films.

BACKGROUND OF THE INVENTION

There is a continuing need for coatings that protect surfaces against adverse environments. Protective coatings are particularly needed for transportation vehicles, especially aircraft. Aircraft surfaces are subjected to erosion from wind and airborne particulate, water, fuel, and sunlight/UV exposure. Protective surface coatings must be flexible and adherent at temperature extremes, particularly low temperatures. It is also desirable that aircraft protective coatings be decorative, especially for commercial aircraft where logos and color schemes are used for carrier differentiation. Therefore, such coatings must be easily and permanently pigmented.

Marine environments present unique challenges to protective coatings for boats and ships of all sizes. In particular, ocean-going craft are subject to extremes of weather and water temperature, an environment that is corrosive to most metals, and organisms, such as molds, slimes and barnacles whose presence on ship's hulls is detrimental. A film-based coating that can discourage organism growth and provide weatherability has not been described heretofore.

Typically, clear or pigmented liquid coatings are used as protective coatings, but these suffer from a number of drawbacks, most notably the use of volatile organic compounds (VOCs) as solvents for their preparation and application. An increasing number of restrictions on VOCs has led to development of water-borne and high-solids coatings, the use of which has limitations due to long drying times, slow cure rates, and inadequate weatherability. Adhesively-applied pigmented films have been proposed as alternative protective coatings. However, films that are, e.g., cost-effective, easily conformed to irregular surfaces and are unaffected by harsh environments have not been found.

Films and coatings comprising fluoro-containing polymers (i.e., polymers prepared from monomers that are fluorinated, preferably highly fluorinated, most preferably perfluorinated) are known and their inertness toward moisture, many solvents, and weathering conditions is known. For example, TEFLON™ is a poly (tetrafluoroethylene) compound that has found considerable use as a repellant for rain when incorporated into or spray-applied to clothing, upholstery, and other fabrics. However, fluoro-containing polymers are generally non-polar and do not easily adhere to many common surfaces such as wood, metals, and other polymers. In addition, fluoro-containing polymers generally are more expensive than their hydrocarbon polymer counterparts. Improved, cost-effective, strongly-adhering, long-lasting fluoro-containing polymer protective coatings are continually in demand.

Interpenetrating polymer networks (IPNs), systems comprising two independent crosslinked polymer networks, have been described. See, for example, *Encyclopedia of Polymer Science and Engineering* Vol. 8; John Wiley & Sons, New York (1984) p. 279 and L. H. Sperling, "Interpenetrating Polymer Networks and Related Materials," Plenum Press, New York (1981). In particular, IPNs comprising acrylate and urethane networks have been prepared by either sequential or simultaneous (but independent) polymerization of free-radically polymerizable ethylenically-unsaturated acrylate-type monomers and urethane precursors (i.e., polyisocyanate and polyhydroxy coreactants). See, for example, U.S. Pat. Nos. 4,128,600, 4,342,793, 4,921,759, 4,950,696, 4,985,340, 5,147,900, 5,256,170, 5,326,621, 5,360,462, and 5,376,428.

Free-standing protective and/or decorative multi-layer films for outdoor use (e.g., outdoor signs, automobile bodies) are known. Typically, such films comprise an adhesive layer, a film layer that may optionally be pigmented, and an overlay or protective layer. Effective protective films must adhere strongly to the substrate (which is often a metal or an already-coated metal) and withstand challenges from heat, oxidants, solvents, sunlight, scratches, and impinged objects such as hailstones and rocks while maintaining their gloss or other decorative aspects, and, in many cases, be easily removable without leaving residual adhesive. See, for example, U.S. Pat. Nos. 5,387,304, 5,306,548 and 5,334,450, 5,378,520 and 4,808,471; European Patent Application Nos. 359,532 and 519,278 and PCT patent application Nos. 92/22619 and 94/099983.

U.S. Pat. No. 5,009,936 describes a transparent top coat applied to a conventional finish coat using a wet-on-wet process. A transparent acrylic layer, comprising functionalized acrylic oligomers and a melamine-type crosslinker is coated, while wet, with a transparent fluorine-containing polymer layer comprising a fluoro-containing polymer that may have hydroxyalkyl or carboxyalkyl functionality and a crosslinker that may comprise a polyisocyanate. The two layers are thermally cured simultaneously. IPN carrier films are not disclosed.

U.S. Pat. No. 4,921,759 describes a transparent plastic sheet prepared by first forming a thin layer of acrylic monomer(s) and free-radical initiator or hydroxy-functional acrylic polymer(s) on a support, covering the acrylic(s) with a reactive mixture of polyisocyanate(s) and polyol(s), then heating the construction. When the construction is cured, the acrylic layer is said to interpenetrate the urethane layer such that no distinct surface layer is observed. Fluoroacrylate layers are not described.

U.S. Pat. No. 4,844,955 describes a multilayer article comprising a thin, thermoplastic cosmetic layer chemically bonded to a cross-linked, isocyanate-modified, thermosetting unsaturated substrate resin. The thermoplastic layer can itself be multilayered, and can comprise, e.g., an acrylic resin or a polyvinylidene fluoride resin or a resin having chemical functionality. The substrate can be a polyester resin or a polyether resin, and can also contain acrylate monomers. On heating together, reactive groups of each layer combine chemically to form a strong interlayer bond. Provision is also made for use of a tie layer that contains chemical groups reactive towards both layers. IPN substrates are not described, nor are fluoroacrylate cosmetic layers.

A number of methods are known for affecting the appearance and performance of film materials, among which is the imposition of a regular or irregular pattern on a surface of the film. The pattern may impart desirable characteristics to the film, such as gloss, reflection-, anti-reflection-, or partial reflection of light, anti-blocking, or improved physical strength. Patterns can be formed by embossing, molding, etching, engraving, or any number of similarly effective means. See, for example, U.S. Pat. No. 4,986,496, particularly Examples 4 and 5.

SUMMARY OF THE INVENTION

Briefly, the present invention provides a multi-layered film disposed upon a substrate, the multi-layer film comprising:

(a) an interpenetrating polymer network (IPN) layer; and
(b) at least one fluoro-containing polymer layer.

The multi-layered film of the present invention as described above wherein the fluoro-containing polymer layer comprises a perfluoro-acrylate homo- or co- polymer and such layer is typically sequenced between the PSA layer and the IPN layer.

The multi-layered film of the invention is disposed upon a substrate. The substrate can be a cured adhesive, preferably a cured pressure-sensitive adhesive. Alternatively, the substrate can be a surface to be protected (can also be referred to as a "protectable surface") from exposure to weather, chemical exposure, graffiti, or the like, such as, for example, a vehicle such as an automobile, a truck, a boat, or an aircraft; an outdoor sign; or a building exterior.

Alternatively, the multi-layered film of the invention comprises i) at least one of the fluoro-containing polymer layers;
ii) a fluorinated copolymer layer, and
iii) an interpenetrating polymer network layer such that the fluorinated copolymer layer is sequenced between the IPN layer and the fluoro-containing layer and comprises a copolymer that is the reaction product of at least one monomer from the IPN layer and a fluorinated monomer. Preferably, the fluorinated monomer is present in the fluoro-containing polymer layer. Preferably, the fluoro-containing polymer layer comprises a perfluoro-acrylate homo- or copolymer, perfluoro-vinyl non-acrylate homo- or copolymer, or at least one fluorinated copolymer.

In yet another embodiment, the multi-layered film comprises a PSA layer, an IPN layer and at least two fluoro-containing polymer layers, wherein the fluoro-containing polymer layers are on either side of the IPN layer.

Preferably, the IPN layer comprises a urethane-acrylate IPN, more preferably a urethane-acrylate IPN in which the urethane component provides durability and solvent resistance and the acrylate component provides toughness and flexibility.

Preferably, the multi-layered film of the invention further comprises a release liner on each side of the multi-layer construction.

In one preferred embodiment, the fluoro-containing polymer layer comprises a homo- or copolymer comprising one or more perfluoro vinyl monomers. More preferably, this layer comprises a copolymer of tetrafluoroethylene, hexafluoropropylene and vinylidene fluoride. Most preferably, this layer comprises a member of the THV ™ family of perfluorinated vinyl films. The invention further provides a method of making a protective film comprising the steps of:

(a) coating or otherwise depositing a layer comprising curable IPN film precursors onto a cured adhesive film;
(b) coating or otherwise depositing a fluoro-containing topcoat layer onto the curable IPN film precursors, wherein the fluoro-containing topcoat layer is selected from the group consisting of a cured fluoropolymer and an energy-curable fluoropolymer precursor; and
(c) applying at least one of heat and light energy to the construction to cure the curable IPN film precursors and the energy-curable fluoropolymer precursor.

The invention further provides a method of making a protective film comprising the steps of:

(a) coating or otherwise depositing a layer comprising curable IPN film precursors onto a surface to be protected;
(b) coating or otherwise depositing a fluoro-containing topcoat layer over/atop the curable IPN film precursors, wherein the fluoro-containing topcoat layer is selected from the group consisting of a cured fluoropolymer and an energy-curable fluoropolymer precursor; and
(c) applying at least one of heat and light energy to the construction to cure the curable IPN film precursors and the energy-curable fluoropolymer precursor.

In a further embodiment, the invention provides a method of making a protective film wherein the patterned/embossed surface of a previously-patterned/embossed release liner is in contact with the outermost layer of the protective film so as to transfer the pattern to the outermost layer. Thus, the invention provides a patterned protective film.

DETAILED DESCRIPTION OF THE INVENTION

What has not been described in the art, and is the subject of the present invention, is a film-based protective coating for articles subject to outdoors weathering, that has superior conformability, solvent resistance, weatherability (impervious to degradation under, e.g., intense and/or prolonged UV exposure), adhesion, low temperature flexibility and ease of removability, and is manufactured and applied under solvent-free (low/no volatile organic compound (VOC)) conditions.

Industrial and military performance specifications for aircraft protective coverings are among the most stringent, and those standards are referred to in the present application, but use of the multilayer IPN film of the invention is not limited to aircraft. Other demanding applications for protective surfaces include boat hulls, automobile rocker panels, outdoor signage, buildings, etc.

In a first embodiment, multilayer protective films of the invention comprise a surface (outermost) layer that is at least one of an interpenetrating polymer network (IPN) and a fluorinated polymer. When both an IPN and fluoro-containing polymer layer are present, the fluoro-containing polymer layer comprises the outermost layer. When present, the fluorinated polymer layer may optionally be bound to the IPN layer directly adjacent thereto by means of covalent bonds. Covalent bonding can result from specific conditions used when the fluorinated layer is deposited and subsequently cured. The IPN layer has an adhesive layer deposited on the side away from the fluoro-containing polymer or surface layer. Optionally, an intermediate tie layer, optionally comprising a fluoro-containing polymer, may connect the IPN layer to the adhesive layer.

When a surface fluoro-containing polymer layer is present, the film can be prepared by coating and partially curing the surface fluoro-containing polymer layer onto a first release liner, coating and fully curing the adhesive layer onto a second release liner, then coating and thermally curing the interpenetrating polymer layer between the adhesive layer and the surface fluoro-containing polymer layer, which curing step serves to complete the cure of the surface fluoro-containing polymer layer. The second release liner can be removed prior to application of the adhesive layer to a substrate and the first is subsequently removed from the surface (fluoro-containing polymer) layer prior to use of the protective film in its ultimate configuration.

In a second embodiment, multilayer protective films of the invention comprise a surface (outermost) layer that is at least one of an IPN and a fluorinated polymer. When both an IPN and fluoro-containing polymer layer are present, the fluoro-containing polymer layer comprises the outermost layer. When present, the fluorinated polymer layer may optionally be bound to the IPN layer directly adjacent thereto by means of covalent bonds. Covalent bonding can result from specific conditions used when the fluorinated layer is deposited and subsequently cured.

In the second embodiment, the film is prepared by coating partially curing the surface fluoropolymer layer onto a release liner, then coating and thermally curing the interpenetrating polymer layer between the surface fluoro-containing polymer layer and the substrate to be protected, which curing step serves to complete the cure of the surface fluoro-containing polymer layer. In other words, a bond of sufficient strength can be formed between the IPN and the substrate such that no intervening adhesive layer is needed. In this embodiment, of course, only one release liner (adjacent to the surface fluoro-containing polymer layer) is required.

Optionally, in either of the above embodiments, the release liner directly adjacent to the surface fluoropolymer layer can comprise a patterned structure, such that the pattern is transferred to the underlying fluoro-containing polymer layer when the release liner is removed. The components of the protective film of the invention will now be discussed in detail, in a sequence beginning with the adhesive layer (e.g., the layer to be applied directly to the substrate). However, as stated above, it is within the scope of the present invention that some embodiments of the protective film will not have an adhesive layer, in those cases where the IPN layer (see below) is coated directly onto the substrate.

Adhesive layers may be coated directly onto a release liner. The release liner can be any of a number of such materials available in the industry, providing that the release liner excludes oxygen from the curable adhesive composition during subsequent curing of the IPN. Preferably, the release liner is a polyester film that typically has been coated on at least one side with a suitable low-surface energy composition, including, but not limited to, silicone resins, poly(tetrafluoroethylene) resins, fluoro-containing polymer resins, synthetic wax, and the like. As is commonly practiced in the art, the adhesive layer may be applied to the release liner by any of a number of applicable methods, such as solvent casting, roll coating, curtain coating, gravure coating, knife coating, hot melt coating, and the like. Preferably, the adhesive layer is cured after coating onto the release liner and the IPN layer is subsequently laminated or coated thereto.

In a another embodiment, an adhesive layer may be coated directly onto the cured IPN film of the invention (see description, below) and cured, then covered with a release liner for storage and/or transportation prior to application of the protective film.

For a wide variety of substrates, acrylate-type adhesives comprising one or more polymerized acrylic acid non-tertiary alcohol ester monomers are appropriate. These so-called "pressure-sensitive adhesives," or PSAs, are described, for example, in U.S. Reissue No. 24,906. Acrylate adhesives are typically copolymers of a major proportion of an acrylic acid ester of a non-tertiary alcohol containing from about 4 to about 14 carbon atoms and a minor portion of at least one modifying polar acrylic-type monomer. Acrylic acid esters useful in adhesives of the multilayered films of the invention may include, but are not limited to n-butyl acrylate, hexyl acrylate, heptyl acrylate, octyl acrylate, isooctyl acrylate, 2-ethylhexyl acrylate, isobornyl acrylate, and combinations thereof. Preferred acrylic acid esters include isooctyl acrylate, 2-ethylhexyl acrylate, isobornyl acrylate, and combinations thereof. Modifying polar acrylic-type monomers may include, but are not limited to, acrylic acid, methacrylic acid, acrylamide, methacrylamide, acrylonitrile, methacrylonitrile, N-vinylpyrrolidone, N-substituted acrylamides such as, hydroxyalkyl acrylates, maleic anhydride, itaconic acid, and combinations thereof. A preferred polar monomer is N,N-dimethylacrylamide, due to its lack of reactivity with, e.g., isocyanates present in the IPN layer. In constructions wherein an isocyanate-reactive polar monomer is required (e.g., acrylic acid), an optional barrier layer (see below) can be used to prevent undesired side reactions between constituents of each layer.

Photoinitiators suitable for the preparation of PSAs include acyloin ethers (e.g., benzoin ethyl ether, benzoin isopropyl ether, anisoin ethyl ether and anisoin isopropyl ether), substituted acyloin ethers (e.g., alpha-hydroxymethyl benzoin ethyl ether), Michler's ketone (4,4'-bis[dimethylamino]benzophenone), and the like. A preferred photoinitiator is 2,2-dimethoxy-2-phenyl acetophenone, commercially available as KB-1™ from Sartomer Company, Inc., Exton, Pa.

Preferably, acrylate adhesives may contain a multifunctional acrylate crosslinking agent. Crosslinking agents useful in adhesive of the invention include, but are not limited to glycerol diacrylate, glycerol triacrylate, ethylene glycol diacrylate, diethylene glycol diacrylate, triethylene glycol dimethacrylate, 1,3-propanediol dimethacrylate, 1,6-hexanediol diacrylate, 1,8-octanediol diacrylate, neopentyl glycol diacrylate, trimethylolpropane triacrylate, 1,4-cyclohexanediol diacrylate, pentaerythritol triacrylate, -tetraacrylate and -tetramethacrylate, and combinations thereof. The preferred crosslinking agents are multifunctional acrylates, most preferably 1,6-hexanediol diacrylate. Alternatively, photoactive crosslinking agents may be used in conjunction with the photoinitiator. Photoactive crosslinking agents include benzaldehyde, acetaldehyde, anthraquinone, substituted anthraquinones, various benzophenone-type compounds and certain chromophore-substituted vinyl halomethyl-s-triazines, such as 2,4-bis(trichloromethyl)-6-p-methoxystyryl-s-triazine.

Acrylate adhesives useful in the invention can further comprise additives, adjuncts, and fillers, as are known in the art. In particular, the use of tackifying agents, or "tackfiers," in adhesive formulations is a common practice. Tackifiers can be present in amounts ranging from about 0% by weight to about 80% by weight, preferably 0 to about 50% by weight. The choice of a particular tackifier can be dependent upon factors such as the nature of the adhesive, the nature of the substrate, the operating or application temperature(s) for the adhesive, etc, and the present disclosure should be taken to include tackifiers of all chemical classes insofar as they are compatible with the acrylate adhesives of the invention. Tackifiers useful in the present invention include rosins and rosin derivatives, aromatic hydrocarbon resins, aliphatic hydrocarbon resins, terpene resins, modified and/or special resins, and combinations thereof. For example, useful tackifiers include the Regalrez™ family of hydrocarbon resins, commercially available from Hercules, Inc., Wilmington, Del.

A preferred adhesive composition for the multilayer films of the invention comprises from about 60 to about 95% by weight of IOA, preferably from about 70 to about 90 wt % IOA, and most preferably from about 75 to about 85 wt % IOA; from about 1 to about 40 wt % IBA, preferably from about 5 to about 25 wt % IBA, most preferably from about 10 wt % to about 20 wt % IBA; and from about 5 to about 30 wt % Regalrez™ 6108 tackifier resin (hereinafter referred to as "RR6108™"), commercially available from Hercules, Inc., Wilmington, Del., preferably from about 10 to about 25 wt % RR6108, and most preferably from about 15 wt % to about 25 wt % RR6108.

Preferably, adhesives useful in protective films of the invention are prepared by coating a monomer mixture or a partially-polymerized monomer mixture onto a release liner, then curing the mixture to form a PSA by a low-intensity UV photopolymerization process, as described, for instance, in U.S. Pat. No. 4,181,752, incorporated herein by reference.

Preferably, the viscosity of the polymerizable adhesive mixture can be increased to a desirable level so that it can be handled more conveniently during coating processes. In order to increase the mixture viscosity to a desirable level, the monomer(s) can be partially prepolymerized. Prepolymerization can be accomplished by exposure to electromagnetic radiation (such as actinic radiation), by thermal polymerization, or a combination thereof. For example, partial prepolymerization can be accomplished in an inert (e.g., nitrogen) atmosphere using a bank of 40-watt fluorescent black lights to provide coatable syrups of a viscosity (e.g., Brookfield) of about 1500 cps, wherein a photopolymerization initiator, such as, e.g., 2,2-dimethoxy-2-phenyl acetophenone, commercially available as KB-1™ from Sartomer Company, Inc., Exton, Pa., can be present in the adhesive mix. Preferably, the photoinitiator is present in a catalytically-effective amount, and such amounts are typically in the range of from about 0.01 parts to 5 parts, and more preferably in the range of from about 0.025 parts to about 2 parts by weight, based upon 100 total parts by weight of adhesive monomer(s). However, other methods of increasing the viscosity of the polymerizable mixture are also available, such as addition of viscosity-modifying agents such as glycerin or high molecular weight polymers, or thixotropic agents such as colloidal silicas and the like.

A second class of adhesives useful in the present invention are silicon-urea adhesives, prepared by the reaction of certain amine-terminated silicones with isocyanates, as described in PCT patent application Nos. 96/34028 and 96/35458. Silicon-urea adhesives are typically cured thermally, in an extruder, then optionally further crosslinked under electron-beam irradiation after coating.

The adhesive layer may be from about 0.5 mm to about 0.013 mm thick, preferably from about 0.25 mm to about 0.013 mm thick, and most preferably, from about 0.05 mm to about 0.013 mm thick, in order to maximize adhesion to the substrate and minimize overall thickness of the protective film.

Adhesive layers useful in the protective films of the invention are chosen so as to be compatible with and adherent to both the target substrate and the IPN film layer. Useful adhesives can include acrylates, natural- or synthetic-rubber adhesives, homo- or co-polymerized alpha-olefins that are at least partially amorphous in nature, post-curable PSA-structural adhesive combinations, silicone-ureas, and the like, so long as the adhesive and its monomeric precursors are compatible with and are not detrimental to the functioning of the IPN layer.

The major component of the protective film of the invention is a central film layer adjacent to the adhesive layer and bonded thereto. As will be described in greater detail below, it is within the scope of the invention that an intermediate tie layer may be interposed between the adhesive layer and the central film layer, for instance, to improve adhesion between the central film layer and the adhesive layer.

Preferably, the central film layer comprises an interpenetrating polymer network (IPN) comprising one or more acrylate polymers and one or more urethane polymers. Each constituent will be discussed separately, in detail. Hereinafter, the central film layer will be referred to as "the IPN layer," in order to distinguish it from other layers of the protective film.

The interpenetrating polymer network layer of the present invention is prepared by simultaneous thermal cure of a mixture of acrylate monomer(s) via free-radical polymerization and urethane precursors, namely polyisocyanates and polyfunctional alcohols, via condensation polymerization.

A wide variety of acrylate monomers and/or oligomers can be used in preparing the IPN layer of the invention, including mono-, di-, and polyacrylates and -methacrylates, such as methyl acrylate, methyl methacrylate, ethyl acrylate, isopropyl methacrylate, isooctyl acrylate, n-hexyl acrylate, 2-ethylhexyl acrylate, stearyl acrylate, isobornyl acrylate, tetrahydrofurfuryl acrylate, perfluorinated octyl acrylate, caprolactone acrylate, allyl acrylate, glycerol diacrylate, ethylene glycol diacrylate, diethylene glycol diacrylate, triethylene glycol dimethacrylate, 1,3-propanediol diacrylate, 1,3-propanediol dimethacrylate, 1,6-hexanediol diacrylate, 1,8-hexanediol diacrylate, neopentyl glycol diacrylate, 1,4-cyclohexanediol diacrylate, propoxylated neopentyl glycol diacrylate, glycerol triacrylate, trimethylolpropane triacrylate, 1,2,4-butanetriol trimethacrylate, pentaerythritol triacrylate, pentaerythritol tetraacrylate and -tetramethacrylate, sorbitol hexaacrylate, bis[1-(2-acryloxy)]-p-ethoxyphenyl dimethylmethane, bis[1-(3-acryloxy-2-hydroxy)]-p-propoxyphenyl dimethylmethane, tris-hydroxyethylisocyanurate trimethacrylate, bis-acrylates and bis-methacrylates of polyalkylene glycols, and combinations thereof.

Preferably, a combination of a monofunctional acrylate or methacrylate and a polyfunctional, preferably difunctional, acrylate or methacrylate, is used in the IPN films of the invention. The monofunctional acrylate or methacrylate monomer(s) may be selected from the group consisting of isooctyl acrylate, tetrahydrofurfuryl acrylate, phenoxyethyl acrylate, isobornyl acrylate, perfluorinated octyl acrylate, caprolactone acrylate, and combinations thereof. The polyfunctional acrylate or methacrylate monomer(s) may be selected from the group consisting of propoxylated neopentyl glycol diacrylate, 1,6-hexanediol diacrylate, 1,3-propanediol diacrylate, trimethylolpropane triacrylate, and combinations thereof.

Thermal initiators useful in preparing the IPN film layer include, but are not limited to, azo, peroxide, persulfate and redox initiators.

Suitable azo initiators include, but are not limited to, 2,2'-azobis(4-methoxy-2,4-dimethylvaleronitrile) (VAZO™ 33), 2,2'-azobis(2-amidinopropane) dihydrochloride (VAZO™ 50), 2,2'-azobis(2,4-dimethylvaleronitrile) (VAZO™ 52), 2,2'-azobis(isobutyronitrile) (VAZO™ 64), 2,2'-azobis(2-methylbutyronitrile) (VAZO™ 67), and 1,1'-azobis(1-cyclohexanecarbonitrile) (VAZO™ 88), all of which are available from DuPont Chemicals, Wilmington, Del., and 2,2'-azobis(methyl isobutyrate) (V-601™), available from Wako Chemicals U.S.A. Inc., Richmond, Va.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl)peroxydicarbonate (PERKADOX™ 16), available from Akzo, Nobel Chemicals, Inc., Chicago, Ill., di(2-ethylhexyl)peroxydicarbonate, t-butylperoxypivalate (Lupersol™ 11), available from Elf Atochem North America, Philadelphia, Pa., t-butylperoxy-2-ethylhexanoate (Trigonox™ 21-C50), available from Akzo, Nobel Chemicals, Inc., and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based upon organic peroxides and tertiary amines, such as benzoyl peroxide plus dimethylaniline; and systems based on organic hydroperoxides and transition metals, such as cumene hydroperoxide plus cobalt naphthenate.

Other initiators include, but are not limited to, pinacols, such as teteraphenyl- 1,1,2,2-ethanediol.

Preferred thermal free radical initiators are selected from the group consisting of azo compounds and peroxides. Most preferred are benzoyl peroxide, Lupersol™ 11, and Perkadox™ 16, and combinations thereof.

The initiator is present in a catalytically-effective amount and such amounts are typically in the range of from about 0.01 parts to 5 parts, and more preferably in the range of from about 0.025 parts to about 2 parts by weight, based upon 100 total parts by weight of the total IPN formulation. If a mixture of initiators is used, the total amount of the mixture of initiators would be as if a single initiator was used.

The polyisocyanate component of the polyurethane precursors that can be cured or polymerized in the IPN layer of the present invention may be any aliphatic, cycloaliphatic, aromatic or heterocyclic polyisocyanate, or any combination of such polyisocyanates. Particularly suitable polyisocyanates correspond to the formula $$Q(NCO)_p \quad (I)$$

in which p is an integer of from 2 to 4, and Q represents:

- an aliphatic hydrocarbon di-, tri-, or tetra-radical containing from 2 to 100 carbon atoms and zero to 50 heteroatoms;
- a cycloaliphatic hydrocarbon radical containing from 4 to 100 carbon atoms and zero to 50 heteroatoms;
- an aromatic hydrocarbon radical or heterocyclic aromatic radical containing from 5 to 15 carbon atoms and zero to 10 heteroatoms; or
- an aliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorous.

Examples of polyisocyanates are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanotomethylcyclohexane (isophorone diisocyanate, IDPI), 2,4-and 2,6-hexahydrotolylene diisocyanate, perhydo-2,4'- and -4,4'-diphenylmethane diisocyanate ($H_{12}$ MDI), hexahydro-1,3- and -1,4-phenylene diisocyanate, 1,3- and -1,4-phenylene diisocyanate, 2,4- and 2,6-tolylene diisocyanate, diphenylmethane-2,4'- and -4,4'-diisocyanate, mixtures of 2,2,4- and 2,4,4-trimethyl hexamethylene diisocyanate (TMDI), naphthylene- 1,5-diisocyanate, including mixtures of these isomers, as well as the reaction products of four equivalents of the aforementioned isocyanate-containing compounds with compounds containing two equivalents of isocyanate-reactive groups, and any combination of the above diisocyanates.

IPN films of the invention can also be prepared using, for example, triphenylmethane-4,4',4"-triisocyanate, polyphenyl polymethylene polyisocyanates (British Patent Nos. 874,430 and 848,671); m- and p-isocyanatophenyl sulfonyl isocyanates (U.S. Pa. No. 3,454,606); perchlorinated aryl polyisocyanates (U.S. Pat. No. 3,227,138); polyisocyanates containing carbodiimide groups (U.S. Pat. No. 3,152,162); norbornane diisocyanates (U.S. Pat. No. 3,492,330); polyisocyanates containing allophanate groups (such as DESMODUR XP 7040™, available from Bayer Chemicals, Philadelphia, Pa.); polyisocyanates containing isocyanurate groups (such as DESMODUR N-3300™, available from Bayer Chemicals); polyisocyanates containing urethane groups (U.S. Pat. No. 3,396,164 and 3,664,457); polyisocyanates containing acrylated urea groups (German Patent No. 1,230,778); polyisocyanates containing biuret groups (such as DESMODUR N-100™, available from Bayer Chemicals); polyisocyanates produced by telomerization reactions (U.S. Pat. No. 3,654,106); polyisocyanates containing ester groups (U.S. Pat. No. 3,567,763); polyisocyanates prepared from the reaction of any of the above-mentioned diisocyanates with acetals (German Patent No. 1,072,385) and polyisocyanates containing polymeric fatty acid esters (U.S. Pat. No. 3,455,883).

Preferred polyisocyanates for use in films of the invention include Desmodur N-100™, Desmodur XP 7040E™, Desmodur N-3300™ and combinations thereof.

Suitable co-reactants with polyisocyanates for formation of the polyurethane component of the IPN layer are compounds containing one or more reactive hydroxyl groups, particularly compounds containing from about 2 to about 50 hydroxyl groups and above all, compounds having a weight average molecular weight of from about 50 to about 25000, preferably from about 700 to about 2000. For example, polyesters, polyethers, polythioethers, polyacetals, polycarbonates, poly(meth)acrylates, polyurethanes, and polyester amides containing at least 2, generally 3 or more hydroxyl groups, as well as hydroxyl-containing prepolymers of these compounds reacted with a less-than-equivalent quantity of polyisocyanates (of the type known for production of polyurethanes) can be used in the present invention.

It is, of course, possible to use combinations of the above-mentioned compounds containing at least two isocyanate-reactive hydrogen atoms and having a weight average molecular weight of from about 50 to about 50000, e.g., combinations of polyethers and polyesters. It is known that a combination of low-melting and high-melting polyhydroxyl-containing compounds can be particularly advantageous.

Low molecular weight compounds containing at least two isocyanate-reactive hydrogen atoms (weight average molecular weight of from about 50 to about 400) suitable for use in accordance with the present invention are compounds preferably containing hydroxyl groups and generally containing from 2 to about 8, and preferably from 2 to about 4 isocyanate reactive hydrogen atoms. Combinations of different compounds containing at least two isocyanate-reactive hydrogen atoms and having a weight average molecular weight in the range of from about 50 to about 400 can also be used. Examples of such compounds include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bishydroxymethyl cyclohexane, 2-methyl-1,3-propane diol, dibromobutene diol, glycerol, trimethylolpropane, 1,2,6-hexanetriol, trimethylolethane, pentaerythritol, quinitol, mannitol, sorbitol, diethylene glycol, triethylene glycol, tetraethylene glycol, dipropylene glycol, higher polypropylene glycols, higher polyethylene glycols, higher polybutylene glycols,4, 4'-dihydroxy diphenylpropane, dihydroxymethyl hydroquinone, and combinations thereof.

Other polyols suitable for purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal catalysts and compounds capable of enediol formation as cocatalysts (see, e.g., German Patent Applications 2,639,084, 2,714,084, 2,714,104, 2,721,186, 2,738,154, and 2,738,512). Solutions of polyisocyanate polyaddition products, particularly solutions of polyurethane ureas containing ionic groups and/or solutions of polyhydrazodicarbonamides, in low molecular weight polyhydric alcohols may also be used as the polyol component of polyurethanes of the invention.

Many other compounds containing isocyanate-reactive hydrogen atoms (e.g., amines) and polyisocyanates are useful in the present invention, as would be obvious to one skilled in the art.

Higher molecular weight polyols include the polyethylene and polypropylene oxide polymers in the weight average molecular weight range of from about 200 to about 20,000, such as the Carbowax™ 400, 600, 800, 1000, 3350, 8000 and 20000 series of poly(ethylene oxide) compounds (available from Union Carbide Corp., Danbury, Conn.), caprolactone polyols in the weight average molecular weight range of from about 200 to about 5000, such as the Tone™ 200, 210, 230, 240, 260, 301, 305, and 310 series of polyols (available from Union Carbide), poly(tetramethylene ether) glycols in the weight average molecular weight range of from about 200 to about 4000, such as the Terethane™ 1000 and 2000 series of polyols (available from DuPont Co., Wilmington, Del/), hydroxy-terminated polybutadiene materials, such as the Poly bd™ series of polyols (available from Elf Atochem, Philadelphia, Pa.), and random copolymers of poly(tetramethylene oxide)/polycarbonate, such as the PolyTHF™ CD series of polyols (available from BASF Corporation, Mount Olive, N.J.). Preferred polyester polyols include the Desmophen™ family, available from Bayer, Pittsburgh, Pa., as Desmophen™ 670-80, 670-100, 800, and 1100. A preferred acrylic polyol is Joncryl™ 587, commercially available from S. C. Johnson & Son, Inc., Racine, Wis.

Another group of preferred polyols consists of hydroxyalkylated bisphenol derivatives. Preferred polyols in this group have the following general formula:

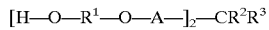

wherein $R^1$ is either a straight or branched or cyclic alkylene (e.g., methylene, ethylene, butylene, decylene) group consisting of 1 to 10 carbon atoms, or an aralkylene group consisting of 7 to 14 carbon atoms (e.g., benzylidene, 1,2-diphenylethylene, phenethylene); $R^2$ and $R^3$ independently may be an alkyl group, aralkyl group, cycloalkyl group, alkaryl group, or an aryl group of from 1 to about 30 carbon atoms (preferably methyl, ethyl, and trifluoromethyl) and none or from 1 to about 10 heteroatoms, and $R^2$ and $R^3$ together can comprise an alkylene, cycloalkylene, arylene, alkarylene or aralkylene group containing from 2 to about 660 carbon atoms and none or from 1 to about 10 heteroatoms;

A can be a substituted or unsubstituted arylene group, preferably having from 6 to about 12 carbon atoms, most preferably p-phenylene, o-phenylene or dimethylnaphthalene.

Specific preferred hydroxyalkylated bisphenols include 9,9-bis-4-(2-hydroxyethyoxphenyl)fluorene (i.e., hydroxyethylated bisphenol of fluorenone), 2,2-bis-4-(2-hydroxyethoxyphenyl)butane (i.e., hydroxyethylated bisphenol of 2-butanone), 2,2-bis-4-(2-hydroxyethyoxphenyl)hexafluoropropane (i.e., hydroxyethylated bisphenol F), 1,2-bis-4-(2-hydroxyethyoxphenyl) propane, 2,2-bis-4-(2-hydroxyethoxyphenyl)norbornane, 2,2-bis-4-(2-hydroxyethoxyphenyl)-5,6-cyclopentanonorbornane, and 1,1-bis-4-(2-hydroxyethoxyphenyl) cyclohexane.

Preferably, the hydroxyl-functional material is at least a diol and is present in an amount sufficient to provide a isocyanate-to-polyol ratio in the composition preferably between about 1.1:1 and 0.9:1.

Catalysts for polyurethane formation are known, typically including certain tertiary amines, salts of weak acids, and certain organometallic compounds. While any of the known thermally-activatable catalysts can be used in preparing the polyurethane component of the inventive IPN film, the metal salts of weak organic acids are preferred. Among these may be named dibutyltin dilaurate and tin octoate. Most preferred is dibutyltin dilaurate, for reasons of high catalytic activity, availability, and low cost.

The urethane-acrylate IPN layer can also contain additives, adjuvants, fillers, stabilizers, and the like, so long as such materials do not interfere with formation of the IPN layer and are not deleterious to the functions thereof. Stabilizers against thermal and UV degradation can include o-hydroxybenzophenones, cyanoacrylate esters, 2-(o-hydroxyphenyl)benzotriazoles, hindered amine light stabilizers (HALS), copolymerizable UV absorbers and the like. Further additives can include fillers, such as fumed silica, hydrophobic silica (U.S. Pat. Nos. 4,710,536 and 4,749, 590), alumina, carbon black, and natural and synthetic resins in particulate, flake or fibrous form. For various applications, foaming agents, such as low-boiling hydrocarbons; fluorinated materials; colorants, dyes and pigments; flame-retardants; anti-static agents; flow-control agents; and coupling agents for additives, such as silanes, may be added. When additives are present, they are added in amounts consistent with the publicly known functional uses of such additives.

IPN layers of the invention can be prepared by mixing the acrylic ester monomer(s) and the isocyanate catalyst, then stirring that mixture into a previously-prepared mixture comprising the acrylate thermal polymerization initiator, the polyisocyanate(s), the polyol(s) and any adjuvants, additives or fillers as may be required for the particular formulation. The total mixture is stirred briefly, degassed under vacuum or by bubbling nitrogen through it, then poured into a coater for direct application to a substrate, which may be an adhesive-coated release liner or a final substrate that the film is to protect. The coated mixture is then heated in an oven or, when appropriate, directly on the substrate, to effect cure of both the acrylate and the urethane polymers. As shall be described in more detail below, the mixture can also be coated between two substrates, then cured.

Optionally, an intermediate (tie) layer may be coated between the IPN layer and the adhesive layer in order to improve bonding between the IPN and the adhesive. Improved bonding between the layers may be the result of covalent bonding between the layers and/or improved wetting at the interface between two layers. A high degree of interlayer bonding can result in strong resistance to delamination caused by aircraft fuel, deicing fluids or other solvents. Also, delamination during removal of protective films of the invention can be prevented by strong interlayer bonding. Complete and easy removal is a highly desirable attribute of aircraft protective films, since commercial color schemes and logos are changed often, and damaged sections of film must be replaced quickly. Further, the intermediate layer may provide a barrier between reactive components of the adhesive and IPN layers. For example, some adhesives may contain acrylic acid, which might react with isocyanate present in the uncured IPN layer.

Preferably, the intermediate layer can be an acrylic ester-type homopolymer or copolymer prepared from acrylate monomers as described above. Most preferably, the intermediate layer consists of homopolymers and copolymers of isooctyl acrylate, perfluorooctyl acrylate, butyl methacrylate, and isobornyl acrylate. When used, the tie layer can be coated onto the adhesive layer, preferably after curing the adhesive layer, and the tie layer can be thermally cured prior to or at the same time as the IPN layer.

When present, the outermost layer of the inventive protective film comprises a polymer prepared by homopolymerizing or copolymerizing polymerizable fluorinated, polyfluorinated or perfluorinated monomer(s), hereinafter referred to as "fluoromonomer(s)." Useful acrylate-type fluoromonomers are those prepared from the esterification reaction of a fluoroalcohol and acrylic acid or methacrylic acid, and include acrylates prepared from 1,1-dihydroperfluorooctanol, 1,1,2,2-tetrahydroperfluorooctanol, 1,1,2,2,3,3-hexahydroperfluorodecanol, 2-N-ethyl perfluorooctanesulfonamido ethanol (EtFOSE), 2-N-methyl perfluorooctanesulfonamido ethanol (MeFOSE), 2-N-ethyl perfluorobutanesulfonamido ethanol, 2-N-methyl perfluorobutanesulfonamido ethanol, 2-N-n-propyl perfluorodecanesulfonamido ethanol, N-ethyl-N-(2-hydroxyethyl)-perfluoroheptanamide, ZONYL BA™, a fluorochemical telomer alcohol commercially available from DuPont Chemicals, and the like. Polyacrylates, i.e., monomers having more than one acrylate group, can be prepared from, e.g., N,N-bis(2-hydroxyethyl) perfluorooctanesulfonamide (FOSEE diol) as well as linear and branched fluorinated polyether polyols such as, for example, the Fomblin-Z-Dol™ and Fluorolink™ series of polyols, commercially available from Ausimont, Morristown, N.J. A useful polyacrylate is LTM-diacrylate, a poly(perfluoroethylene oxide) (perfluoropropylene oxide)α,ω-diacrylate commercially available from 3M Co., St. Paul, Minn. Polyacrylates typically find use as crosslinking agents in acrylate polymers.

Further, acrylate fluoromonomers can be copolymerized with non-fluorinated acrylate monomers, such as those described above as being useful in the preparation of the IPN layer of films of the invention. In such cases, the ratio of fluoromonomer to non-fluoromonomer can be from about 1:10 to about 10:1, preferably from about 1:5 to about 5:1. A second class of acrylate monomers that can be copolymerized with fluoromonomers comprises acrylates having a second chemically reactive group, such as, for instance, a hydroxyl group or an amine group. Preferably, such monomers comprise hydroxy-functional acrylates, examples of which include hydroxyethyl acrylate, hydroxyethyl methacrylate, 3-hydroxypropyl acrylate, 4-hydroxybutyl acrylate, and the like. The hydroxyl functional groups of these copolymers can react with isocyanate groups in the IPN layer to effect a tight bond between the fluoro-containing polymer layer and the IPN.

A second means of creating strong bonds between the fluoro-containing polymer layer and the IPN is through copolymerization of acrylate fluoromonomers and acrylate monomers in the IPN. In a preferred method of making the protective film of the invention, the outermost layer comprising acrylate fluoromonomer(s) is coated onto a first release liner and the IPN layer is coated between the adhesive layer, which itself had been coated onto a second release liner and fully cured, and the fluoromonomer layer. The entire construction is then heated to effect cure of all acrylate monomers. While not wishing to be bound by theory, it is believed that, in this way, acrylate fluoromonomers from the surface layer and acrylate monomers from the IPN can copolymerize to covalently bind the two layers together.

A tie layer can also be used to insure good adhesion between the surface fluoro-containing polymer layer and the IPN. In some instances it may be advantageous to use a fully-cured fluoro-containing polymer layer as the outermost layer of films of the invention. Solvent-cast blends or alloys of poly(vinylidene fluoride) (PVDF) and a thermoplastic polymer, as described in U.S. Pat. No. 5,342,666, incorporated herein by reference. An IPN layer can be coated and cured onto, e.g., a PVDF film to provide a fluoro-containing polymer-containing weatherable construction. Adhesion between the layers can be improved by interposing a tie layer comprising, e.g., a polyacrylate resin. In a preferred embodiment, a tie layer comprising poly(ethyl methacrylate) having a thickness of from about 0.00125 mm to about 0.0125 mm, preferably about 0.005 mm, can be coated on a film comprising an 80:20 blend of PVDF:PMMA, and the two-layer film laminated to an IPN surface, such that the tie layer lies between the PVDF:PMMA and the IPN layers. Preferably, the PVDF:PMMA film has a thickness of from about 0.01 mm to about 0.025 mm, most preferably from about 0.0125 mm to about 0.02 mm.

The outermost layer of protective films of the invention, whether it comprises a fluoro-containing polymer or an IPN, is coated onto or below a second release liner. A general description of materials and uses of release liners has already been presented. However, in the case of the outermost layer of the protective film, additional features and considerations can be accommodated. In particular, it is known in the art that topographical features of release liners can be imparted to the layer below. For example, when glossy smoothness is required in the protective film, use of a very smooth release liner is called for. Conversely, when a matte finish is required, a release liner having some surface roughness can be used. In the case of a protective coating for an aircraft or other vehicle subjected to fluid flow resistance, some advantage in drag reduction could be imparted by use of a protective film having a certain microstructure. Such films are described in U.S. Pat. No. 4,986,516, 5,069,403, and 5,133,516, each of which is incorporated herein by reference. In particular, Example 5 of these references describes a polyurethane film prepared with the use of a drag-reducing microstructured release liner. In a like manner, a microstructured release liner can be used in the construction of a drag-reducing protective film of the invention. Of course, it is within the scope of the invention that any other microstructured surface, whether or not for the purpose of drag reduction, can be imparted to the inventive film.

In a preferred method of making free-standing protective films of the invention, an uncured IPN precursor mixture, comprising acrylate monomer(s), isocyanate(s), polyol(s), free-radical and cationic initiators, and any desired adjuvants, fillers, pigments or other additives, is coated, by means of a roll coater, between an upper liner on which previously has been coated an upper tie layer followed by a fluoro-containing polymer layer, both of which are uncured or only partially cured; and a lower liner on which previously has been coated an adhesive layer and, optionally, a lower tie layer. Preferably, the lower tie layer is coated onto the adhesive layer after the adhesive layer has been fully cured. The entire construction is then passed into a heating oven or other heating device to effect cure of the IPN layer and to complete the cure of the lower tie layer, the upper tie layer and the fluoro-containing polymer layer.

Uniquely, the multi-layered films of the present invention provide a combination of strength, flexibility and chemical inertness. This advantageous combination is particularly useful on the surfaces of vehicles, such as aircraft, boats, trucks and the like, and stationary objects, such as outdoor signage, traffic signage and signals and the like, commonly subjected to weathering and harsh environments. Protective films of the invention can find particular advantage in signs used for traffic guidance, such as retroreflective traffic signs, internally-illuminated traffic signs, and non-reflective painted traffic signs.

This invention is further illustrated by the following examples that are not intended to limit the scope of the invention. In the examples, all parts, ratios and percentages are by weight unless otherwise indicated. The following test methods were used to evaluate and characterize the IPN multi-layered film constructions produced in the examples. All materials are commercially available, for example from Aldrich Chemicals, unless otherwise indicated or described.

EXAMPLES

Test Methods

Weathering

1. Aircraft Replacement Film

An accelerated weathering test was performed according to ASTM G53-95. A film sample measuring 5.08 cm×7.62 cm (2"×3") was applied to a 7 cm×20.3 cm×0.64 mm (2.75"×8"×0.025") aluminum panel that had been cleaned with isopropyl alcohol and wiped dry with a lint-free cloth. The film was applied starting at one end of the panel, securing contact progressively toward the other end, avoiding wrinkles and air bubbles, using a poly (tetrafluoroethylene) (PTFE, Teflon™) squeegee. Once applied, the film was further secured by passing the panel through rollers of a laminator with air pressure set at about 221 kPa (32 psig). The test panel was conditioned at 21° C. for about 24 hours, then exposed in an Atlas UVCON Model UC-1 weatherometer (Atlas Electric Devices Co., Chicago, Ill.) for 300 hours with a repeating test regimen of 8 hours UV exposure (UVB 313 fluorescent lamps) at 70° C. black panel followed by 4 hours of condensing humidity at 50° C. Color and gloss measurements were taken at 300 and 500 hours and at test completion.

Color

Using an ACS Specro-Sensor II (Datacolor International, Lawrenceville, N.J.) colorimeter and an IBM personal computer, monitor and printer (IBM Co., Armonk, N.Y.), a color measurement was taken and saved to disk before samples were submitted for weathering tests (supra). At each of 300 hours and 500 hours, the panel was removed from the weatherometer, visually inspected, and a color measurement was taken and compared to the initial value (standard). Readings were reported as $\Delta a$=difference between the two colors in the red/green direction; $\Delta b$=difference between the two colors in the yellow/blue direction; $\Delta H$=hue difference between the standard and the sample; $\Delta C$=difference in saturation; $\Delta L$ =difference in lightness of the gray value of the color; and $\Delta E$=the total color difference, including hue, chroma or saturation, and lightness. An acceptable value was $\Delta E$ less than 1.

Gloss

In accordance with ASTM D523-89, specular gloss measurements were taken using a Gardner Glossgard II Glossmeter (Gardner Neotec Div., Pacific Scientific, Silver Springs, Md.) at 60° geometry by placing the glossmeter on the specimen and reading the gloss value. Gloss was measured at 300 hours and 500 hours of exposure in the weatherometer (supra). An initial specular gloss of 90 was required, and gloss after 500 hours was required to be not less than 80 (i.e. 90% decrease or less).

2. Graphics Overlay Films

An accelerated weathering test was performed according to ASTM G-23-95, Type E and/or ASTM D-822-89. A film sample measuring 5.08 cm×7.62 cm (2"×3") was applied to a 7 cm×20.3 cm (2.75"×8") aluminum panel that had been cleaned with isopropyl alcohol and wiped dry with a lint-free cloth. The film was applied starting at one end of the panel, securing contact progressively toward the other end, avoiding wrinkles and air bubbles, using a poly (tetrafluoroethylene) (PTFE, Teflon™) squeegee. Once applied, the film was further secured by passing the panel through rollers of a laminator with air pressure set at about 221 kPa (32 psig). The test panel was conditioned at 21° C. for about 24 hours, then exposed in an Atlas XW-type weatherometer (Atlas Electric Devices Co.) for 500 hours with a repeating regimen of 102 minutes exposure to an open flame carbon arc filtered by Corex D glass panes (Coming Inc., Coming, N.Y.) at 63° C. black panel followed by 18 minutes of light plus water spray. Color and gloss measurements were taken as described above. Acceptable performance was $\Delta E$ less than 1.

Solvent Resistance

1. Aircraft replacement film

Six film samples measuring 2.54 cm×5.08 cm (1"×2") were secured as described above to 2 aluminum panels, cleaned as described above, 3 samples per panel, such that there was approximately 1.9 cm (¾") between samples and approximately 0.6 cm (¼") margin of panel below each sample. A quick-setting epoxy adhesive (Devcon™ 5-minute epoxy, ITW Devcon, Danvers, Mass.) was applied around the edges of one sample per panel and the other two samples were left unsealed around the edges. The prepared panels were conditioned at 21° C. for 24–48 hours, then placed in a container of Skydrol™ 5W B-4 aviation fluid (MIL-H-83282; Monsanto Chemical Co., St. Louis, Mo.) at 24°±2.8° C. such that from ½ to ¾ of each sample was submerged. The samples were submerged for a total of 30 days, unless blistering, peeling or similar deterioration was observed prior to completion of the period, at which point the sample was removed.

2. Graphics Film

Stain resistance was evaluated by individually adhering samples of IPN films of the invention to 7 cm×28 cm (2.75 in×11 in) aluminum panels, then uniformly defacing the samples with a blue Sharpie™ brand permanent marking pen (Sanford Corp., Bellwood, Ill.). The samples were allowed to dry at 23° C. for approximately 24 hours. To evaluate stain resistance of the sample to ink and permanence of the stain, the samples were cleaned by double-rubbing using uniformly folded paper towels that were wet with methyl ethyl ketone (Aldrich). The number of double rubs required to clean the sample surface was noted, and the subsequent appearance of the sample was assessed according to the following scale:

| Grade | Performance |
|-------|-------------|
| 1 | Excellent removability; no ghosting or staining |
| 2 | Good removability; some ghosting or staining |
| 3 | Poor removability |
| 4 | No removability, sample surface degraded |

Interlayer Adhesion

1. Aircraft Replacement Film

For testing of film adhesion and interlayer bonding, three samples, 2.54×20.3 cm (1"×8") were adhered to a clean aluminum panel by rolling at least twice with a rubber-faced roller weighing 2 kg (4.5 lb), such that approximately 7.6 cm (3") of the sample were secured to the panel, and the IPN layer was adjacent to the aluminum panel. The release liner was retained on the upper surface of the sample and on the lower surface that was not adhered to the test panel. After 48 hours of conditioning at 25.5° C., the free end of the sample was placed in the jaws of an Instron Series IX Automated Materials Testing System, Version 1.15 (Instron Corp., Park Ridge, Ill.) and subjected to 180° peel test at 50.8 cm/min (20 in/min). Evidence of cohesive failure of the adhesive, i.e., the sample is removed from the substrate but adhesive remains on the substrate, was determined. Acceptable values were less than 5% cohesive failure.

Interlayer bonding of IPN films of the invention was determined as follows: the fluorinated layer of a protective film comprising a fluorinated layer and an IPN layer was firmly adhered to a poly(ethylene terephthalate) (PET) film, using a quick-setting epoxy adhesive (Devcon™ 5-minute epoxy, ITW Devcon, Danvers, Mass.). Next, the IPN layer was adhered to a cleaned aluminum test panel using the same quick-setting epoxy adhesive, and the sandwich construction was aged for 12 hours at 25° C. The test panel was clamped firmly and a portion of the PET film was placed in the jaws of an Instron tensile testing machine and peeled at 180° at a cross-head speed of 50.8 cm/min (20 in/min). Evidence of failure of the bond between the fluorinated layer and the IPN layer of the sample was determined and reported as a percent of interlayer adhesion failure.

2. Graphics Overlay Film

In order to test adhesion of one layer of a multilayer assembly to another, a crosshatch adhesion test, based upon ASTM D3359-90, was performed. A film sample measuring 5.08 cm×7.62 cm×0.6 mm (2"×3") was applied to a 7.6 cm×22.9 cm×0.64 mm (3"×9"×0.025") aluminum panel that had been cleaned with isopropyl alcohol and wiped dry with a lint-free cloth. The film was applied starting at one end of the panel, securing contact progressively toward the other end, avoiding wrinkles and air bubbles, using a poly(tetrafluoroethylene) (PTFE, Teflon™) squeegee. Once applied, the film was further secured by passing the panel through rollers of a laminator with air pressure set at about 221 kPa (32 psig). The test panel was conditioned at 21° C. for at least 24 hours and not more than 48 hours. The film was then cut with a sharp razor blade in a cross-hatch fashion, with the cuts approximately 3 mm (⅛") apart, typically six cuts in each direction. A length of #610 transparent tape (3M Co., St. Paul, Minn.) sufficient to cover the cuts was applied and pressed in place using the Teflon™ squeegee, such that a free end of the tape long enough to grasp in the fingers is available. The panel was held in one hand and the tape pulled back across the applied area, at approximately 180°, at a rapid rate. Results are reported as % area removed. An acceptable value is less than 5%.

Tensile and Elongation

Tensile strength and total elongation were tested according to ASTM Test Method D882-80a.

In the following examples, all materials were available commercially from Aldrich Chemical Co., Milwaukee, Wis., unless otherwise specified.

Example 1

Aircraft Paint Replacement Film

A urethane/acrylate aircraft paint replacement IPN film was prepared by mixing 1.75 grams propoxylated neopentyl glycol diacrylate (Sartomer SR9003™, Sartomer Co., Inc., Exton, Pa.), 4.02 grams isooctyl acrylate (IOA, 3M Co., St. Paul, Minn.), 2.63 grams dimethyl acrylamide, and 2.63 grams isobornyl acrylate (IBA), to which was added a solution of 0.50 grams Tinuvin 123™ hindered amine antioxidant (Ciba-Geigy Corp., Tarrytown, N.Y.), 0.38 grams Uvinul 3039™ UV stabilizer (BASF Corp., Mt. Olive, N.J.) and 0.063 grams BYK-066™ flow control agent (BYK-Chemie, Wallingford, Conn.) in 2.00 grams IOA. Next, a solution of 0.33 grams di-(4-t-butylcyclohexyl) peroxydicarbonate thermal free-radical initiator (Perkadox™ 16, Akzo Nobel Chemicals Inc., Stratford, Conn.) in 2.00 grams IOA was added with stirring, followed by a solution of 0.0075 grams dibutyl tin dilaurate initiator in 1.00 grams caprolactone acrylate (Union Carbide Corp., Danbury, Conn.), which was followed by a solution of 2.07 grams of acrylic polyol (Joncryl™ 587, S. C. Johnson and Sons, Inc., Racine, Wis.) in 2.48 grams IOA. Finally, 3.94 grams of polyester polyol (Tone™ 0301, Union Carbide Corp.) were added, and the mixture was stirred while adding 26.49 grams polyfunctional aliphatic polyisocyanate (Airthane™ ASN-540, Air Products & Chemicals, Allentown, Pa.). The entire mixture was agitated with an air mixer for one minute and degassed under 67 Pa (500 mtorr) vacuum for one minute, then knife-coated at a thickness of 0.1 mm between a lower substrate comprising a cured nonpolar acrylic PSA (as described in U.S. Pat. No. 5,602,221, Example 4, incorporated herein by reference) coated on the 6200™ side of a 15.24 cm-wide Daubert 6200/7200™ double-coated differential release liner (Daubert Coated Products, Inc., Westchester, Ill.) and an upper substrate (15.24 cm wide) comprising a 0.045 mm PET liner coated with THV 500™ (fluorinated terpolymer, Dyneon PLC, St. Paul, Minn.) that previously had been partially dehydrofluorinated by treatment with an aqueous NaOH/phase transfer catalyst solution (as described, for example, in U.S. Pat. No. 4742,126). The coated construction was heated from 90° to 120° C. at a rate of 1.5° C./min, then heated at 90° C. for 17 hours.

The above multilayer film had satisfactory weathering performance (ASTM G53-95, above), exhibiting ΔE (color retention)=0.5 and gloss retention=98% after 500 hours exposure.

An IPN film formulation prepared as described was coated between a silicon-treated polyethylene terephthalate (PET) release liner and a base-etched THV liner, i.e., the above formulation without a PSA layer on the lower release liner, and cured using the same regimen as described. The cured IPN film did not delaminate between the IPN and the fluorinated layer under peel-test conditions as described above.

Example 2
Aircraft Paint Replacement Film

A urethane/acrylate aircraft paint replacement IPN film was prepared by mixing 78.62 grams propoxylated neopentyl glycol diacrylate (Sartomer SR9003™), 263.92 grams isooctyl acrylate (IOA) and 47.86 grams caprolactone acrylate (Union Carbide Corp.), to which was added 23.93 grams Tinuvin 123™ hindered amine antioxidant, 17.94 grams Uvinul 3039™ UV stabilizer, 2.99 grams BYK-066™ flow control agent and 0.71 grams dibutyl tin dialkylsulfide polymerization catalyst (DABCO 131™, Air Products and Chemicals, Inc., Allentown, Pa.). A mill base containing 256.37 grams SR9003™ diacrylate and 598.20 grams titanium dioxide (R960™, DuPont Chemicals, Wilmington, Del.) was added, followed by a solution of 15.55 grams Perkadox™ 16 thermal free-radical initiator in 119.64 grams IOA, with stirring. Next, a solution of 99.09 grams Joncryl™ 587 polyol, 188.49 grams Tone 0301™ polyol, and 1267.74 grams Airthane™ ASN-540 polyisocyanate in 118.94 grams IOA was added with stirring. The entire mixture was agitated with an air mixer for 20 minutes and transferred to syringe tubes to be degassed under 67 Pa (500 mtorr) vacuum for 20 minutes. The mixture was coated at a thickness of 0.075–0.1 mm between a lower substrate comprising the cured nonpolar acrylic PSA described in Example 1 coated on the 6200™ side of a 30.5 cm-wide Daubert 6200/7200™ double-coated differential release liner and an upper substrate (30.5 cm wide) comprising a 0.05 mm PET liner coated with 0.02 mm base-treated THV 500™. The coated construction was processed through a 3.66 m two-zone oven set at 115° C., and 135° C., respectively, at 0.6 m/min, then postcured at 90° C. for 17 hours. The IPN film passed the Skydrol™ solvent resistance test described above with the epoxy edge sealed: 30 days immersion without blistering, peeling, or other significant deterioration.

Example 3
Aircraft Paint Replacement Film

A urethane/acrylate aircraft paint replacement IPN film was prepared by mixing 285.38 grams isooctyl acrylate (IOA) and 51.75 grams caprolactone acrylate (Union Carbide Corp.), to which was added 25.87 grams Tinuvin 123™ hindered amine antioxidant, 19.41 grams Uvinul 3039™ UV stabilizer, 3.24 grams BYK-066™ flow control agent and 0.78 grams DABCO 131™ polymerization catalyst. A mill base containing 362.24 grams SR9003™ diacrylate and 90.51 grams red pigment (Perylene Red UV Paste #9R115, Penn Color, Inc., Doylestown, Pa.) was added, followed by a solution of 16.82 grams Perkadox™ 16 thermal free-radical initiator in 129.38 grams IOA, with stirring. Next, a solution of 107.15 grams Joncryl™ 587 polyol, 203.83 grams Tone 0301™ polyol, and 1370.86 grams Airthane™ ASN-540 polyisocyanate in 128.61 grams IOA was added with stirring. The entire mixture was agitated with an air mixer for 20 minutes and transferred to syringe tubes to be degassed under 67 Pa (500 mtorr) vacuum for 20 minutes. The mixture was coated at a thickness of 0.075–0.1 mm between a lower substrate comprising the cured nonpolar acrylic PSA as described in Example 1 coated on the 6200™ side of a 30.5 cm-wide Daubert 6200/7200™ double-coated differential release liner and an upper substrate (30.5 cm wide) comprising a 0.05 mm PET liner coated with 0.02 mm base-treated THV 500™. The coated construction was processed through a 3.66 m two-zone oven set at 115° C. and 135° C., respectively, at 0.6 m/min, then postcured at 90° C. for 17 hours. The IPN film passed the Skydrol™ solvent resistance test described above with the epoxy edge sealed: 30 days immersion without blistering, peeling, or other significant deterioration.

Example 4
Graphics Overlay Film

An IPN film suitable for overlay protection of outdoor graphics films was prepared. First, a poly(fluoroacrylate) layer was prepared by gravure coating a mixture of 1134.65 grams perfluorooctyl acrylate (FOA, 3M Co.), 825.2 grams IBA, 103.15 grams hexanediol diacrylate (HDDA), 3.09 grams 2,2-dimethoxy-2-phenylacetophenone photoinitiator (KB-1™, Ciba-Geigy Corp.) and 5.16 grams Perkadox 16™ onto the 6260 side of a 6200/6260™ differential release liner (Daubert Coated Products, Inc., Westchester, Ill.) at a line speed of 15.24 m/min using a gravure roll having 200 lines/2.54 cm and a volume factor of $9.8 \times 10^{-6}$ mm$^3$/6.75× $10^{-4}$ mm$^2$ (0.63 mil$^3$/mil$^2$). The coated web was passed under medium-pressure UV lamps (Model QC250244ANIR UV Processor, Geo Aetek International, Plainfield, Ill.) at a dose of 99 mJ/cm$^2$ to provide a partially cured fluoroacrylate film.

An IPN film was prepared by mixing 1.40 grams IOA and 0.82 grams caprolactone acrylate, to which was added a solution of 0.50 grams Tinuvin™ 123 hindered amine antioxidant, 0.38 grams Uvinul™ 3039 UV stabilizer, 0.33 grams di-(4-t-butylcyclohexyl)peroxydicarbonate thermal free-radical initiator (Perkadox™ 16) and 0.063 grams BYK-063™ flow control agent in 5.25 grams IBA. To the mixture was added a solution of 0.0075 grams dibutyl tin dilaurate initiator in 1.75 grams propoxylated neopentyl glycol diacrylate (Sartomer SR9003™ ); a solution of 7.58 grams of a first polyol (Joncryl™ 587) in 9.10 grams IOA; 9.75 grams of a polyester polyol (Tone 0305™, Union Carbide Corp., Danbury, Conn.); and 0.28 grams butanediol. The mixture was stirred while adding 14.89 grams polyaromatic polyisocyanate (Desmodur N3300™), after which the entire mixture was agitated with an air mixer for one minute and degassed under 67 Pa (500 mtorr) vacuum for one minute.

The IPN film formulation was knife-coated (0.1 mm thick) between a 15.24 cm wide portion of the above fluoroacrylate film and a 15.25 cm wide, 0.1 mm thick silicone-treated PET release liner (Courtalds Aerospace, Inc.), and the coated construction was cured by heating from 70° to 120° C. at a rate of 2.5° C./min, then heated at 90° C. for 17 hours.

Accelerated weathering, as described above (1—1 Cycle) of the fluoroacrylate-IPN film construction showed satisfactory performance (ΔE less than 0.05, gloss retention greater than 90%). The fluoroacrylate side of the construction was found to have excellent resistance to staining by blue Sharpie™ ink.

Example 5
Fluorinated Layer Between IPN and Cured Adhesive Film

A fluorinated layer was prepared by mixing 50 grams of fluorinated octyl acrylate (FOA, 3M Co., St. Paul, Minn.) with 0.25 grams hexanediol diacrylate (HDDA, Sartomer SR238™, Sartomer Co. Inc., Exton, Pa.) and 0.125 grams 2,2-dimethoxy-2-phenylacetophenone photoinitiator (KB-1™, Ciba-Geigy Corp., Tarrytown, N.Y.). The mixture was shaken until homogeneous. The solution was knife coated at a thickness of 0.025 mm between a lower substrate comprising a cured nonpolar acrylate PSA (as described in U.S.

Pat. No. 5,602,221, Example 4) coated on the 6200™ side of a 15.24 cm-wide Daubert 6200/7200™ double-coated differential release liner and an upper substrate comprising a 0.1 mm PET silicone-coated release liner (Courtalds Aerospace, Inc., Glendale, Calif.). The fluorinated layer was then cured for 7 minutes on each side simultaneously using Sylvania 350BL UV lamps (Siemens Corp./Osram Sylvania Inc.,. Danvers, Mass.).

A urethane/acrylate IPN solution was prepared by mixing 7.75 grams isobornyl acrylate (IBA, Sartomer SR506™, Sartomer Co. Inc., Exton, Pa.); 0.64 grams HDDA; a solution containing 2 grams IBA, 0.5 grams Tinuvin 123™ hindered amine antioxidant (Ciba-Geigy Corp., Tarrytown, N.Y.), 0.38 grams Uvinul 3039™ UV stabilizer (BASF Corp., Mt. Olive, N.J.), and 0.12 grams BYK-066™ flow control agent (BYK-Chemie, Wallingford, Conn.); a solution of 0.3 grams di-(4-t-butylcyclohexyl)peroxydicarbonate thermal free-radical initiator (Perkadox™ 16, Akzo Nobel Chemicals Inc., Stratford, Conn.) in 5 grams IBA; a solution of 0.0075 grams dibutyl tin dilaurate catalyst in 1 gram HDDA; a mill base of 5.36 grams polyester polyol (Tone™ 0301, Union Carbide Corp., Danbury, Conn.) and 6.24 grams titanium dioxide (R960™, DuPont Chemicals, Wilmington, Del.) dispersed with 0.038 grams of K-Sperse™ 152 (King Industries, Norwalk, Conn.) dispersant; 5.36 grams polyester polyol (Tone™ 0305, Union Carbide Corp.); 0.5 grams powdered molecular sieves Type 4A (UOP Molecular Sieves, Des Plaines, Ill.); and 16.59 grams aliphatic polyisocyanate (Desmodur N100™). The mixture was agitated with an air mixer for one minute and degassed under vacuum (67 Pa, 500 mtorr) for 3 minutes. The solution was knife coated at a thickness of 0.076 mm between 15.24 cm wide release liner (Scotchpak™ 1022, 3M Co., St. Paul, Minn.), and the fluorinated side of the film produced above. The sample was then cured for 20 minutes at 85° C. and postcured at 60 ° C. for 16 hours.

The cured multi-layer film was subjected to Skydrol™ solvent resistance testing as described above, but without the epoxy adhesive edge sealer. Under these conditions, the time to complete film removal is measured. The film of this example remained on the panel for 35 days.

What is claimed:

1. A multi-layered film comprising:
   a. an interpenetrating polymer network layer, and
   b. at least one fluoro-containing polymer layer, wherein the film is disposed on a substrate.

2. The multi-layered film according to claim 1, wherein the substrate is a protectable surface.

3. The multi-layered film according to claim 1, wherein the substrate is a cured adhesive.

4. The multi-layered film according to claim 3, wherein the cured adhesive is a pressure-sensitive adhesive.

5. The multi-layered film according to claim 1, wherein at least one of the fluoro-containing polymer layers is sequenced between the pressure sensitive adhesive layer and the interpenetrating polymer network layer.

6. The multi-layered film according to claim 4, wherein at least one of the fluoro-containing polymer layers comprises a perfluorooctyl acrylate homo- or copolymer.

7. The multi-layered film according to claim 1, further comprising (i) at least one of the fluoro-containing polymer layers, (ii) a fluorinated copolymer, and (iii) the interpenetrating polymer network layer, wherein the fluorinated copolymer layer is sequenced between the interpenetrating polymer network layer and the fluoro-containing polymer layer and comprises a reaction product of a fluorinated monomer and at least one monomer from the interpenetrating polymer network.

8. The multi-layered film according to claim 7, wherein the fluoro-containing polymer layer comprises a perfluoroacrylate homo- or copolymer, perfluoro-vinyl non-acrylate homo- or copolymer, or at least one fluorinated polymer.

9. The multi-layered film according to claim 7, wherein the film has an outermost surface and such outermost surface is a microstructured surface.

10. The multi-layered film according to claim 1, wherein the interpenetrating polymer network layer comprises a urethane-acrylate interpenetrating polymer network.

11. The multi-layered film according to claim 1, wherein at least one of the fluoro-containing polymer layers comprises the reaction product of one or more perfluoro-vinyl monomers.

12. The multi-layered film according to claim 1, wherein at least one of the fluoro-containing polymer layers comprises a copolymer of tetrafluoroethylene, hexafluoropropylene and vinylidene fluoride.

13. The multi-layered film according to claim 1, further comprising a second fluoro-containing polymer layer, wherein the interpentrating polymer network layer is between the first fluoro-containing polymer layer and the second fluoro-containing polymer layer.

14. The multi-layered film according to claim 13, wherein the first and second fluoro-containing polymer layers comprise the same fluoro-containing polymer.

15. The multi-layered film according to claim 13, wherein the first and second fluoro-containing polymer layers comprise different fluoro-containing polymers.

16. The multi-layered film according to claim 1, wherein the substrate is a retroreflective sign.

17. The multi-layered film according to claim 1, wherein the film has an outermost surface and such outermost surface is a microstructured surface.

18. A method for preparing a protective film comprising the steps of:
   a. coating or otherwise depositing a layer comprising curable interpenetrating polymer network film precursors onto a substrate;
   b. coating or otherwise depositing a fluoro-containing topcoat layer onto the curable interpenetrating polymer network film precursors, wherein the fluoro-containing topcoat layer is selected from the group consisting of a cured fluoropolymer and an energy-curable fluoropolymer precursor; and
   c. applying at least one of heat or light energy to the coatings to cure the curable interpenetrating polymer network film precursors and the energy-curable fluoropolymer precursor.

19. The method according to claim 18, wherein the substrate is a surface to be protected.

20. The method according to claim 18, wherein the substrate is a cured adhesive film.

21. The method according to claim 20, wherein the cured adhesive film is a pressure-sensitive adhesive.

* * * * *